US009168694B2

United States Patent
Kim et al.

(10) Patent No.: US 9,168,694 B2
(45) Date of Patent: Oct. 27, 2015

(54) TRANSPARENT RESIN COMPOSITION

(71) Applicant: LG Chem, Ltd., Seoul (KR)

(72) Inventors: Dong-Ryul Kim, Daejeon (KR);
Boong-Goon Jeong, Daejeon (KR);
Dae-Woo Nam, Daejeon (KR);
Myeong-Geun Ko, Daejeon (KR)

(73) Assignee: LG Chem, Ltd. (KR)

( * ) Notice: Subject to any disclaimer, the term of this patent is extended or adjusted under 35 U.S.C. 154(b) by 75 days.

(21) Appl. No.: 13/942,002

(22) Filed: Jul. 15, 2013

(65) Prior Publication Data

US 2014/0024782 A1    Jan. 23, 2014

Related U.S. Application Data

(62) Division of application No. 12/319,469, filed on Jan. 7, 2009, now Pat. No. 8,513,358.

(30) Foreign Application Priority Data

Jan. 8, 2008 (KR) .................. 10-2008-0002348
Jun. 23, 2008 (KR) .................. 10-2008-0058907

(51) Int. Cl.
| | |
|---|---|
| B29C 47/00 | (2006.01) |
| B29C 55/04 | (2006.01) |
| B29C 55/12 | (2006.01) |
| C08L 33/10 | (2006.01) |
| C08L 33/12 | (2006.01) |
| C08L 45/00 | (2006.01) |
| C08L 63/10 | (2006.01) |
| B29C 55/00 | (2006.01) |
| C08L 63/00 | (2006.01) |
| C08L 33/08 | (2006.01) |
| C08L 71/00 | (2006.01) |
| C08J 5/18 | (2006.01) |
| C08L 53/00 | (2006.01) |

(52) U.S. Cl.
CPC ............ B29C 55/04 (2013.01); B29C 47/0021 (2013.01); B29C 55/005 (2013.01); B29C 55/12 (2013.01); C08J 5/18 (2013.01); C08L 33/08 (2013.01); C08L 33/10 (2013.01); C08L 33/12 (2013.01); C08L 45/00 (2013.01); C08L 63/00 (2013.01); C08L 71/00 (2013.01); C08G 2650/56 (2013.01); C08L 53/00 (2013.01)

(58) Field of Classification Search
None
See application file for complete search history.

(56) References Cited

U.S. PATENT DOCUMENTS

| | | |
|---|---|---|
| 4,419,399 A | 12/1983 | Ichikawa et al. |
| 4,607,079 A | 8/1986 | Giles, Jr. et al. |
| 4,727,117 A | 2/1988 | Hallden-Abberton et al. |
| 4,877,833 A | 10/1989 | Kondo et al. |
| 5,004,777 A | 4/1991 | Hallden-Abberton et al. |
| 5,049,313 A | 9/1991 | Frentzel |
| 5,200,492 A | 4/1993 | Ohnaga et al. |
| 5,244,862 A | 9/1993 | Bailey |
| 5,344,868 A | 9/1994 | Hallden-Abberton et al. |
| 5,710,216 A | 1/1998 | Weber et al. |
| 5,891,357 A | 4/1999 | Akashi et al. |
| 5,905,554 A | 5/1999 | Kyu |
| 5,994,022 A | 11/1999 | Tanabe et al. |
| 6,080,833 A | 6/2000 | Otsuji et al. |
| 6,197,898 B1 | 3/2001 | van den Berg et al. |
| 7,704,570 B2 | 4/2010 | Takebe et al. |
| 7,875,328 B2 | 1/2011 | Um et al. |
| 8,293,841 B2 * | 10/2012 | Kim et al. ............ 525/185 |
| 8,344,083 B2 | 1/2013 | Um et al. |
| 8,512,825 B2 * | 8/2013 | Kim et al. ............ 428/1.33 |
| 8,513,358 B2 * | 8/2013 | Kim et al. ............ 525/117 |
| 2002/0018163 A1 | 2/2002 | Yamamoto et al. |
| 2002/0039651 A1 | 4/2002 | Murata |
| 2003/0043730 A1 | 3/2003 | Uchiyama et al. |
| 2003/0137620 A1 | 7/2003 | Wang et al. |
| 2004/0063887 A1 | 4/2004 | Toyomasu et al. |
| 2005/0046967 A1 | 3/2005 | Kosaka et al. |
| 2005/0068492 A1 | 3/2005 | Itoh et al. |
| 2005/0117099 A1 | 6/2005 | Yamaoka et al. |
| 2005/0129895 A1 | 6/2005 | Nakamura |
| 2006/0013967 A1 | 1/2006 | Mikoshiba et al. |
| 2006/0055853 A1 | 3/2006 | Murakami et al. |
| 2006/0063105 A1 | 3/2006 | Oberlander et al. |
| 2006/0063858 A1 | 3/2006 | Kang et al. |
| 2006/0066787 A1 | 3/2006 | Yoda et al. |
| 2006/0066946 A1 | 3/2006 | Liu et al. |
| 2006/0093845 A1 | 5/2006 | Chien et al. |
| 2006/0177607 A1 | 8/2006 | Ohmori et al. |

(Continued)

FOREIGN PATENT DOCUMENTS

| | | |
|---|---|---|
| CN | 101087846 A | 12/2007 |
| EP | 0267574 A | 11/1987 |

(Continued)

OTHER PUBLICATIONS

JPO Website Machine English Translation of JP 2004-204208, Suzuki, Jul. 22, 2004.

Hcengpei Wu et al: "Miscibilty of Phenoxy Polymer/Polyacrylate Blends", Macromolecular Chemistry and Physics, Wiley-VCH Verlag, Weinheim, DE, vol. 197 No. 10, Oct. 1, 1996, pp. 3191-3197, XP 000634279.

Young Soo Soh: "Miscibility of Polymethyl Methacrylate With Poly (Hidroxy Ether) of Bisphenol A" Journal of Applied Polymer Science, John Wiley and Sons Inc. New York, US, vol. 45, No. 10, Aug. 5, 1992, pp. 1831-1835.

(Continued)

*Primary Examiner* — Robert Sellers
(74) *Attorney, Agent, or Firm* — Lerner, David, Littenberg, Krumholz & Mentlik, LLP

(57) ABSTRACT

The present invention relates to a transparent resin composition which comprises (a) a (meth)acrylate based resin comprising one or more (meth)acrylate based derivatives; and (b) an aromatic based resin having a chain having the hydroxy group containing portion and an aromatic moiety.

12 Claims, No Drawings

(56) References Cited

U.S. PATENT DOCUMENTS

| | | |
|---|---|---|
| 2006/0252234 A1 | 11/2006 | Saiki |
| 2007/0141355 A1 | 6/2007 | Kosaka et al. |
| 2007/0172181 A1 | 7/2007 | Imai et al. |
| 2007/0282077 A1 | 12/2007 | Miyamoto et al. |
| 2008/0266493 A1* | 10/2008 | Yonezawa et al. ............ 349/96 |
| 2009/0197020 A1 | 8/2009 | Kim et al. |
| 2009/0275718 A1 | 11/2009 | Um et al. |

FOREIGN PATENT DOCUMENTS

| | | |
|---|---|---|
| EP | 0483917 A | 10/1990 |
| EP | 0483717 A2 | 5/1992 |
| EP | 0717078 A1 | 6/1996 |
| EP | 1865346 A1 | 12/2007 |
| EP | 1933181 A1 | 6/2008 |
| JP | 62-89705 A | 4/1987 |
| JP | 4146984 A | 5/1992 |
| JP | 4-266957 A | 9/1992 |
| JP | 6155932 A | 6/1994 |
| JP | 7157632 A | 6/1995 |
| JP | 08248202 A | 9/1996 |
| JP | 10-030048 A | 2/1998 |
| JP | 2000256635 A | 9/2000 |
| JP | 2001-220515 A | 8/2001 |
| JP | 2002243943 A | 8/2002 |
| JP | 2002301788 A | 10/2002 |
| JP | 2003315557 A | 11/2003 |
| JP | 2004045893 A | 2/2004 |
| JP | 2004-204208 A | 7/2004 |
| JP | 2005070534 A | 3/2005 |
| JP | 2005266464 A | 9/2005 |
| JP | 2006220726 A | 8/2006 |
| JP | 2007-031537 A | 2/2007 |
| JP | 2007046044 A | 2/2007 |
| JP | 2007112956 A | 5/2007 |
| JP | 2007169583 A | 7/2007 |
| JP | 2007169586 A | 7/2007 |
| JP | 2007263987 A | 10/2007 |
| JP | 2007321108 A | 12/2007 |
| JP | 2011509434 | 3/2011 |
| KR | 20030069461 A | 8/2003 |
| KR | 20040029251 A | 4/2004 |
| KR | 20040045790 A | 6/2004 |
| KR | 20050065154 A | 6/2005 |
| KR | 20050083709 A | 8/2005 |
| KR | 523083 B | 9/2006 |
| KR | 20070003388 A | 1/2007 |
| KR | 20070113749 A | 11/2007 |
| TW | 200728838 | 8/1995 |
| TW | 304519 B1 | 9/2003 |
| TW | 200621817 A | 7/2006 |
| TW | 200717045 | 5/2007 |
| TW | 200732690 A | 9/2007 |
| TW | 200734392 | 9/2007 |
| WO | WO 03/070849 A1 * | 8/2003 |
| WO | WO 2007/043356 A1 * | 4/2007 |
| WO | 2008/001855 A1 | 1/2008 |

OTHER PUBLICATIONS

JPO Website Machine English Translation of JP 07-304870, Matsumoto et al., Nov. 21, 1995.

* cited by examiner

TRANSPARENT RESIN COMPOSITION

CROSS-REFERENCE TO RELATED APPLICATIONS

The present application is a divisional of U.S. patent application Ser. No. 12/319,469, filed Jan. 7, 2009, issued as U.S. Pat. No. 8,513,358, which claims priority from Korean Patent Application Nos. 10-2008-0002348 and 10-2008-0058907 filed Jan. 8, 2008 and Jun. 23, 2008, respectively, the disclosures of which are all incorporated herein by reference.

TECHNICAL FIELD

The present invention relates to a resin composition for transparent goods, which has excellent heat resistance and optical transparency, low haze, an excellent optical property, is not easily broken, excellent mechanical strength, a reduced light leakage phenomenon, and excellent durability.

BACKGROUND ART

Recently, display technologies using various methods such as a plasma display panel (PDP), a liquid crystal display (LCD) and the like that are used instead of a known braun tube in accordance with the development of optical technologies are suggested and sold. The higher properties of the polymer material for displays are required. For example, in the case of the liquid crystal display, according to the development toward the thin film, the lightness, and enlargement of the picture area, the wide viewing angle, the high contrast, the suppression of change in picture color tone according to the viewing angle and the uniformity of the picture display are particularly considered as important problems.

Therefore, various polymer films such as a polarizing film, a polarizer protection film, a retardation film, a plastic substrate, a light guide plate and the like are used, and as the liquid crystal, various modes of liquid crystal displays such as twisted nematic (TN), super twisted nematic (STN), vertical alignment (VA), in-plane switching (IPS) liquid crystal cells are developed. Since these liquid crystal cells have all intrinsic liquid crystal alignment, the intrinsic optical anisotropic property is ensured, and in order to compensate the optical anisotropic property, a film in which a retardation function is provided by stretching various kinds of polymers has been suggested.

In detail, since a liquid crystal display device uses high birefringence property and alignment of liquid crystal molecules, the birefringences are different according to the viewing angle and thus the color and brightness of the picture are changed. Thus, a retardation compensation according to the kind of liquid crystal molecule is required. For example, since most liquid crystal molecules that are used in a vertical alignment manner have the thickness refractive index that is larger than the average in-plane refractive index in a liquid crystal display surface, in order to compensate this, a compensation film in which the thickness refractive index is smaller than the average in-plane refractive index is required.

In addition, light does not pass through the front sides of two polarizing plates that are vertical to each other, but if the angle is inclined, the light axes of two polarizing plates are not vertical to each other, thus light leakage occurs. In order to compensate this, the compensate film that has the in-plane retardation is required. In addition, the display device using the liquid crystal requires both the thickness retardation compensation and the in-plane retardation compensation in order to widen the angle view.

Requirement of the retardation compensation film is to easily control the birefringence. However, the film birefringence is formed by a basic birefringence which belongs to the material and the alignment of polymer chains in the film. The alignment of the polymer chains is mostly forcibly performed by force applied from the outside or is caused by the intrinsic properties of the material, and the alignment method of the molecules by the external force is to uniaxially or biaxially stretch the polymer film.

In the related art, there is a need to develop a polymer material that satisfies the above requirement properties in order to be used in displays.

SUMMARY OF THE INVENTION

It is an object of the present invention to provide a resin composition for transparent goods, which has excellent optical property and optical transparency, and low haze, is not easily broken unlike an acryl based film that is easily broken while stretching and alignment processes are carried out, has excellent mechanical strength, processability, and durability such as heat resistance, a reduced light leakage phenomenon, and various in-plane retardations and thickness retardations.

The present invention provides a transparent resin composition which comprises (a) a (meth)acrylate based resin comprising one or more (meth)acrylate based derivatives; and (b) an aromatic based resin having the chain having the hydroxy group containing portion and an aromatic moiety In addition, the present invention provides a method for manufacturing an optical film, which comprises the steps of preparing the resin composition; and shaping the film by using the resin composition. The manufacturing method may further comprise the step of uniaxially or biaxially stretching the film.

A resin composition according to the present invention is capable of providing optical goods having excellent optical property and optical transparency, and low haze, is not easily broken unlike an acryl based film that is easily broken while stretching and alignment processes are carried out, has excellent mechanical strength, processability, and heat resistance, and an optical film that is manufactured by using the resin composition according to the present invention may have a reduced light leakage phenomenon, and easily controlled in-plane retardations and thickness retardations. Accordingly, the optical goods may be applied to IT (information technology) devices such as display devices and the like for various purposes.

DETAILED DESCRIPTION

A resin composition according to the present invention comprises (a) a (meth)acrylate based resin comprising one or more (meth)acrylate based derivatives; and (b) an aromatic based resin having a chain having the hydroxy group containing portion and an aromatic moiety. The resin composition according to the present invention has excellent transparency and the transmittance thereof is 70% or more and preferably 90% or more.

In the present invention, the (meth)acrylate based resin is capable of providing a retardation property in which a thickness refractive index is larger than an average in-plane refractive index to a film, and the aromatic based resin comprising a chain having the hydroxy group containing portion and an aromatic moiety is capable of providing a retardation property in which a thickness refractive index is smaller than an average in-plane refractive index.

The retardation properties of an optical film are changed according to the composition of each component, presence or absence of stretching, a stretching direction, a stretching ratio, a stretching method such as uniaxial or biaxial stretching. Accordingly, in the present invention, by controlling the composition of each component and the stretching method, the film that has various retardation properties is capable of being produced. Therefore, the stretched film that has the excellent optical properties is capable of being produced. In addition, by controlling the composition of each component and the stretching method, the optical film that hardly has the residual retardation is capable of being produced. For reference, in the present specification, an in-plane retardation ($R_{in}$) and a thickness retardation ($R_{th}$) are defined by the following Equations 1 and 2.

$$R_{in} = (n_x - n_y) \times d \quad \text{Equation 1}$$

$$R_{th} = [(n_x + n_y)/2 - n_z] \times d \quad \text{Equation 2}$$

In Equations 1 and 2, $n_x$ is the largest refractive index among in-plane refractive indexes of the film, $n_y$ is the refractive index in a direction that is vertical to $n_x$ of the in-plane refractive index of the film, $n_z$ is the thickness refractive index of the film, and d is the thickness of the film.

In addition, the resin composition according to the present invention is capable of providing an optical film that has excellent mechanical properties unlike an acryl based film that is easily broken. In addition, (a) the resin is capable of providing excellent optical properties, and (b) the resin is capable of providing excellent miscibility with the compound comprising (a) the resin. In addition, the optical film that is manufactured by using the resin composition according to the present invention has excellent mechanical property including toughness by the aromatic based resin having the chain having the hydroxy group containing portion and an aromatic moiety.

Since the resin composition according to the present invention is capable of controlling a value of photoelasticity coefficient according to the content of (b) the resin, a change in retardation value by external stress is small, it may be used for various purposes. In particular, since the optical property is excellent, it may be applied to manufacture transparent goods.

The resin composition according to the present invention may further include a cyclic based unit having (c) a cyclic portion. (c) the unit may be included in (a) the resin, and may be included as a compound that is different from (a) the resin or (b) the resin. (c) the unit is capable of providing excellent heat resistance to the film.

The optical film according to the present invention may control the miscibility of the resin composition according to the contents of a (meth)acrylate based resin, a aromatic based resin having a chain having the hydroxy group containing portion and an aromatic moiety, and the cyclic based unit having the cyclic portion.

The content of each resin is not particularly limited, and in consideration of the role of each component, in order to obtain desired in-plane retardation, thickness retardation, optical property, mechanical property, transparency, miscibility and the like, the content of each component may be determined. For example, the contents of (a) the resin, (b) the resin and (c) the unit each may be selected within a range of about 0.1 to 99% by weight. To be specific, it is preferable that the content of (a) the resin is in the range of about 39 to about 98% by weight, the content of (b) the resin is in the range of about 0.5 to about 60% by weight, and the content of (c) the resin is in the range of about 0.5 to about 40% by weight.

In the present invention, the compound comprising (a) the resin, (b) the resin, or (c) the unit may be a homopolymer or a copolymer, and within a range in which the object of the present invention is not spoiled, a comonomer may be further included. The copolymer may be a random or block copolymer.

In the present invention, it should be understood that (a) the resin may include (meth)acrylate and a (meth)acrylate derivative. To be specific, as the (meth)acrylate based monomer, there are methyl methacrylate, methyl acrylate, ethyl acrylate, butyl acrylate, 2-ethylhexyl methacrylate, lauryl methacrylate, benzyl methacrylate and the like, but it is not limited thereto. In particular, it is most preferable that methyl methacrylate (MMA) is used.

The (meth)acrylate based resin may be a homopolymer or a copolymer of the (meth)acrylate based derivative, and may be a copolymer comprising another kind of comonomer.

In the present invention, as (a) the resin, a copolymer comprising the (meth)acrylate based unit and (c) the cyclic based unit having the cyclic portion may be used. In the case of (a) the resin includes (c) the unit, (a) the resin may include the copolymer including at least one two kinds or more of the (meth)acrylate based derivative and the cyclic based unit. The content of the (meth)acrylate based unit in the copolymer comprising the (meth)acrylate based unit and cyclic based unit having the cyclic portion is in the range of about 50 to 99% by weight, and preferably in the range of about 70 to about 98% by weight, and the content of the cyclic based unit having the cyclic portion is in the range of about 1 to 50% by weight and preferably about 2 to about 30% by weight. When the content of the cyclic based unit having the cyclic portion is 50% by weight or less, it is useful to reduce a haze value of the film.

The cyclic based unit having the cyclic portion of the copolymer comprising the (meth)acrylate based unit and the cyclic based unit having the cyclic portion functions to improve heat resistance of the film. Examples of the cyclic based unit having the cyclic portion will be described below. However, it is most preferable that the cyclic based unit having the cyclic portion, which is included in the copolymer in conjunction with the (meth)acrylate based unit, is a maleimide based unit including a maleimide portion. The maleimide based unit may include a cyclic portion that is derived from a compound selected from the group consisting of N-cyclohexylmaleimide, N-phenylmaleimide, N-methylmaleimide, N-butylmaleimide and the like, but is not limited thereto. In particular, it is most preferable that it includes the cyclic portion that is derived from N-cyclohexylmaleimide. However, the above examples are provided to illustrate the present invention, but not to limit the range of the present invention. The cyclic portion may also be selected from the group consisting of maleic anhydride, maleimide, glutaric anhydride, glutalimide, lactone, and lactame.

The copolymer comprising the (meth)acrylate based unit and the cyclic based unit having the cyclic portion may be manufactured by a method such as a bulk polymerization, a solution polymerization, a suspension polymerization, an emulsion polymerization and the like using a (meth)acryl based monomer and cyclic based monomer such as a maleimide based monomer.

In the present invention, it is preferable that the number average molecular weight of the aromatic based resin comprising the chain having the hydroxy group containing portion and an aromatic moiety is in the range of 1,500 to 2,000,000 g/mol. It is preferable that the aromatic based resin includes the phenoxy based resin. Here, the phenoxy based resin includes a structure in which at least one oxygen radical is bonded to the benzene cycle. For example, the (b) aromatic based resin may include one or more units that are represented by the following Formula 1. (b) the aromatic based resin includes 5 to 10,000 of the unit of the following Formula 1, preferably 5 to 7,000 of the unit of the following Formula 1, and more preferably 5 to 5,000 of the unit of the following Formula 1. In the case when two kinds or more units of the following Formula 1 are included in (b) the aromatic based resin, they may be included in a random form, an alternating form, or a block form.

Formula 1

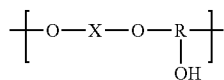

wherein X is a divalent group comprising at least one benzene cycle and R is a straight- or branched-chained alkylene group having 1 to 6 carbon atoms.

To be specific, it is preferable that X is a divalent group that is derived from the compounds of the following Formulas 2 to 4, but is not limited thereto.

Formula 2

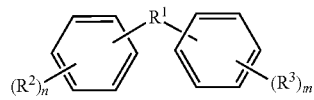

$R^1$ is a direct bond, straight- or branched-chained alkylene having 1 to 6 carbon atoms, or cycloalkylidene having 3 to 20 carbon atoms, $R^2$ and $R^3$ are each hydrogen, straight- or branched-chained alkyl having 1 to 6 carbon atoms, or straight- or branched-chained alkenyl having 2 to 6 carbon atoms, and n and m are each an integer in the range of 1 to 5.

Formula 3

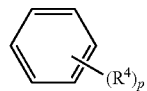

$R^4$ is each hydrogen, straight- or branched-chained alkyl having 1 to 6 carbon atoms, or straight- or branched-chained alkenyl having 2 to 6 carbon atoms, and p is an integer in the range of 1 to 6.

Formula 4

$R^6$ and $R^7$ are each a direct bond, straight- or branched-chained alkylene having 1 to 6 carbon atoms, or cycloalkylidene having 3 to 20 carbon atoms, $R^5$ and $R^8$ are each hydrogen, straight- or branched-chained alkyl having 1 to 6 carbon atoms, or straight- or branched-chained alkenyl having 2 to 6 carbon atoms, and q and r are each an integer in the range of 1 to 5.

Detailed examples of the compounds that are represented by Formulas 2 to 4 are the same as the following compounds, but are not limited thereto.

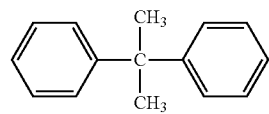

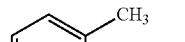

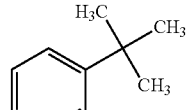

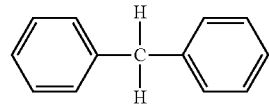

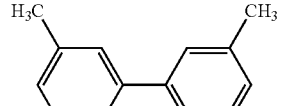

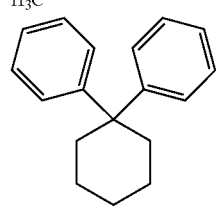

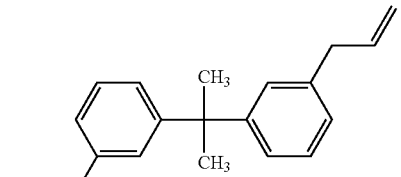

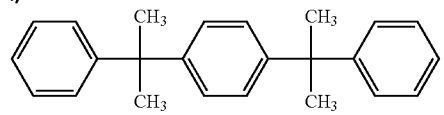

It is most preferable that (b) the aromatic based resin includes one kind or more 5 to 10,000 phenoxy based units that are represented by the following Formula 5.

Formula 5

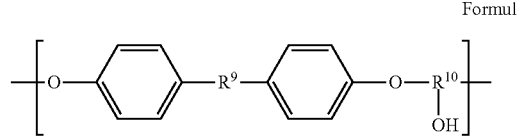

wherein $R^9$ is a direct bond, straight- or branched-chained alkylene having 1 to 6 carbon atoms, and $R^{10}$ is a direct bond, straight- or branched-chained alkylene having 1 to 6 carbon atoms.

It is preferable that Formula 5 is represented by the following Formula 6.

Formula 6

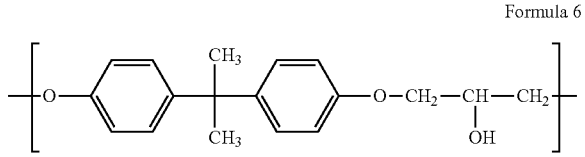

An end of the aromatic based resin may be an OH group.

In the present invention, (c) the unit may improve the heat resistance of the film. The content of (c) unit is in the range of about 0.1 to about 99% by weight, and preferably about 0.5 to about 40% by weight. Examples of the cyclic portion of (c) the unit include maleic anhydride, maleimide, glutaric anhydride, glutalimide, lactone and lactame, but are not limited thereto.

According to an embodiment of the present invention, as the component of the resin composition, 1) a copolymer comprising the (meth)acrylate based unit and the maleimide based unit, and 2) the phenoxy based (phenoxy-based) resin may be used. In this case, it is preferable that the content of each component is in the range of 1 to 99% by weight. To be specific, the content of 1) the copolymer is preferably in the range of about 40 to about 99% by weight and more preferably in the range of about 75 to about 98% by weight. The content of the 2) resin is preferably in the range of about 0.5 to about 60% by weight and more preferably in the range of about 1 to about 30% by weight. In particular, in the case when the content of the maleimide based monomer in the copolymer comprising 1) the (meth)acrylate based unit and maleimide based unit is 50% by weight or less, regardless of the mixing ratio of 1) to 2) components, it can show miscibility in respects to the entire range, and the optical film having the above composition is advantageous in that it has a single glass transition temperature $T_g$.

The thickness of the optical film that is manufactured by using the resin composition according to the present invention is in the range of 5 to 500 μm, and more preferably 5 to 300 μm, but is not limited thereto. The transmittance of the optical film is 90% or more, the haze is 2.5% or less, preferably 1% or less, and more preferably 0.5% or less. It is preferable that the glass transition temperature of the optical film is 100° C. or more.

A method for manufacturing an optical film by using the resin composition according to the present invention comprises the steps of preparing the resin composition; and shaping the film by using the resin composition. The method for manufacturing an optical film may further include the step of uniaxially or biaxially stretching the film.

The resin composition may be manufactured by melting and blending the above components. The melting and the mixing of the components may be carried out by using an extruder.

The resin composition may further include a lubricant, an antioxidant, a UV stabilizer, a thermal stabilizer and the like that are generally used.

When the optical film is manufactured, a method that is known in the art may be used, and in detail, an extrusion molding method may be used. For example, after the resin composition is dried under a vacuum and removes water and dissolved oxygen, the composition is supplied from the raw material hopper to a single or twin extruder that is filled with nitrogen, and melted at a high temperature to obtain a raw material pellet, the obtained raw material pellet is dried under a vacuum, melted from the raw material hopper to a single extruder that is substituted with nitrogen, passes through a coat hanger type T-die, and a chrome-coated casting roll and a drying roll to manufacture the film.

The optical film according to the present invention may have optical properties that $R_{in}>0$ and $R_{th}>0$ by uniaxial or biaxial stretching.

The stretching process may be carried out by using any one of a longitudinal direction (MD) stretching and a transverse direction (TD) stretching or both of the longitudinal direction stretching and the transverse direction stretching. In the case of when both of the longitudinal direction stretching and the transverse direction stretching are carried out, any one of them may be first carried out and then the other may be carried out, or both of them may be carried out simultaneously. The stretching may be carried out through a single step or through multi-steps. In the case of when the stretching is carried out in the longitudinal direction, the stretching may be carried out by using a difference in speed between rolls, and in the case of when the stretching is carried out in the transverse direction, the tenter may be used. The rail initiating angle of the tenter is 10° or less, a bowing phenomenon that occurs when the transverse direction stretching is carried out is suppressed, and the angle of the optical axis is regularly controlled. By carrying out the transverse direction stretching through multi-steps, the suppression phenomenon of the bowing phenomenon may be obtained.

The stretching may be carried out at a temperature in the range of (Tg−20° C.) to (Tg+30° C.) when the glass transition temperature of the resin composition is $T_g$. The glass transition temperature means a range from a temperature at which storage elasticity of the resin composition starts to be reduced and the loss elasticity starts to be larger than the storage elasticity to a temperature at which alignment of the polymer chain is loosened and removed. The glass transition temperature may be measured by using a differential scanning calorimeter (DSC).

In the case of a small stretching machine (Universal testing machine, Zwick Z010), it is preferable that the stretching rate is in the range of 1 to 100 mm/min. In the case of a pilot stretching machine, it is preferable that the stretching rate is in the range of 0.1 to 2 mm/min. In addition, it is preferable that the film is stretched by using a stretching ratio in the range of 5 to 300%.

The stretching may be carried out through a separate step that is different from the shaping of the film, or carried out through one step in the same process as the shaping of the film. By uniaxially or biaxially stretching the optical film according to the present invention by using the above method, it may have a retardation property that is different from that before the stretching is carried out.

By appropriately combining the composition, the longitudinal direction stretching ratio, the transverse direction stretching ratio, the stretching temperature and the stretching rate of the aromatic based resin comprising the (meth)acrylate based resin and the chain and an aromatic moiety having the hydroxy group containing portion with each other, the optical film that is capable of being used as the retardation film for compensating the viewing angle of the liquid crystal display may be easily manufactured. In order to obtain uniformity in respects to physical properties of the optical film, it is preferable that the thickness deviation of the raw cloth of the film before it is stretched is about 3% of the thickness of the film. In order to stably realize the desired retardation of the stretched film, it is preferable that the retardation of the raw cloth of the film before it is stretched is as small as possible, and it is preferable that it is 5 nm or less on the basis of retardation (the multiplication of the in-plane birefringence difference and the thickness of the film). In order to obtain the retardation uniformity in the MD and TD, it is preferable that the retardation deviation of the raw cloth of the film before it is stretched is 5 nm or less.

In addition, since toughness of the stretched film is increased, a disadvantage of the (meth)acrylate based film that is easily broken may be effectively compensated.

The transparent film may be used for an optical film, a polarizer protective film of a polarizing plate, a retardation compensation film and the like, but is not limited thereto.

Hereinbelow, the present invention will be described in detail with reference to Examples. The present invention may, however, be embodied in many different forms and should not be construed as being limited to the Examples set forth herein. Rather, these Examples are provided to fully convey the concept of the invention to those skilled in the art.

EXAMPLE

Polymerization of the Poly(N-Cyclohexylmaleimide-Co-Methylmethacrylate) Resin

Preparation Example 1

247.8 g of methyl methacrylate, 24.8 g of N-cyclohexylmaleimide, and 295.8 g of toluene were put into the glass reactor having the volume of 1 L, nitrogen bubbling was carried out for 15 min to remove dissolved oxygen, and the temperature was maintained at 80° C. After dissolved oxygen was removed from the solution in which 1 g of AIBN initiator and 0.25 g of 1-octylmercaptane were dissolved in 197.2 g of toluene (A) and 223.0 g of methyl methacrylate (B), the reaction solution was dropped onto the reactor for 4 hours and agitated to perform the polymerization. After the reaction was additionally carried out at 80° C. for 2 hours, the reaction temperature was increased to 90° C. After the reaction was performed for 8 hours, 0.13 g of AIBN was added while AIBN was dissolved in toluene and the reaction was additionally carried out for 10 hours.

After the reaction was finished, the conversion rate of the monomer was 85%, in respects to the molecular weight, the weight average molecular weight (Mw) was 97,000 and the number average molecular weight (Mn) was 46,000. The content of N-cyclohexylmaleimide in the final polymer was 6.5% by weight as the result of element analysis.

Preparation Example 2

272.6 g of methyl methacrylate, 99.1 g of N-cyclohexylmaleimide, and 345.1 g of toluene were put into the shallow bed having the volume of 1 L, nitrogen bubbling was carried out for 15 min to remove dissolved oxygen, and the temperature was maintained at 80° C. After dissolved oxygen was removed from the solution in which 1 g of AIBN initiator and 0.25 g of 1-octylmercaptane were dissolved in 147.9 g of toluene and 123.9 g of methyl methacrylate, the reaction solution was dropped onto the reactor for 4 hours and agitated to perform the polymerization. After the reaction was additionally carried out at 80° C. for 2 hours, the reaction temperature was increased to 90° C. After the reaction was performed for 8 hours, 0.13 g of AIBN was added while AIBN was dissolved in toluene and the reaction was additionally carried out for 10 hours.

After the reaction was finished, the conversion rate of the monomer was 82%, in respects to the molecular weight, the weight average molecular weight (Mw) was 97,500 and the number average molecular weight (Mn) was 48,100. The content of N-cyclohexylmaleimide in the final polymer was 24% by weight as the result of element analysis.

Preparation Example 3

223.0 g of methyl methacrylate, 198.2 g of N-cyclohexylmaleimide, and 419.0 g of toluene were put into the shallow bed having the volume of 1 L, nitrogen bubbling was carried out for 15 min to remove dissolved oxygen, and the temperature was maintained at 80° C. After dissolved oxygen was removed from the solution in which 1.13 g of AIBN initiator and 0.25 g of 1-octylmercaptane were dissolved in 74.0 g of toluene and 74.3 g of methyl methacrylate, the reaction solution was dropped onto the reactor for 4 hours and agitated to perform the polymerization. After the reaction was additionally carried out at 80° C. for 2 hours, the reaction temperature was increased to 90° C. After the reaction was performed for 8 hours, 0.13 g of AIBN was added while AIBN was dissolved in toluene and the reaction was additionally carried out for 10 hours.

After the reaction was finished, the conversion rate of the monomer was 94%, in respects to the molecular weight, the weight average molecular weight (Mw) was 93.500 and the number average molecular weight (Mn) was 38,500. The content of N-cyclohexylmaleimide in the final polymer was 50% by weight as the result of element analysis.

Mixing of the Phenoxy Resin and the Poly(N-Cyclohexylmaleimide-Co-Methylmethacrylate) Resin Examples 1 to 9 and Comparative Examples 1 to 2

The resin composition that was described in the following Table 1 was supplied to the extruder that was filled with nitrogen from the raw material hopper to the extruder and had the size of 16 φ, and melted at 250° C. to obtain raw material pellets, the obtained raw material pellets were dried under a vacuum, melted by using the extruder at 250° C., and passed through the coat hanger type of T-die, the chrome coated casting roll and the drying roll to manufacture the film having the thickness of 80 μm. The physical properties of the film are described in the following Table 1.

As the phenoxy based resin, PKFE ($M_w$=60,000, $M_n$=16,000, $T_g$=98° C.) that was manufactured by InChemRez®, Co., Ltd. was used, and as the (metha)acryl based resin, the poly(N-cyclohexylmaleimide-co-methylmethacrylate) resin in which the content of N-cyclohexylmaleimide polymerized in Preparation Example 1 is 6.5% by weight was used.

The glass transition temperature ($T_g$) of the film was measured by using a differential scanning calorimeter (DSC2010) manufactured by TA instrument, Co., Ltd. Under the nitrogen atmosphere, analysis was performed at a heating rate of 10° C./min, and the measured glass transition temperature was determined as the middle temperature of the heat capacity rapid change area in the second scan.

The transmittance and the haze of the film were measured by using the reflectance-transmittance meter (HR-100, Murakami color research Lab.) by JIS K 7105, and three average values were used to obtain the result. The transmittance corresponds to the total transmittance Tt showing the total amount of the transmitted light, and the diffusion penetration ratio Td was measured by using 5% of the integral area to calculate the Haze (=Td/Tt×100).

The photoelasticity coefficient was measured by drawing the film while force that was applied to the film in a tension system was increased, measuring the retardation for each case, plotting in respects to 'stress vs retardation', and evaluating the slope.

TABLE 1

|  | phenoxy based resin (% by weight) | (metha)acrylate based resin (% by weight) | Tg (° C.) | transmittance (%) | Haze (%) | photoelasticity coefficient (×$10^{-12}$ m²/N) |
|---|---|---|---|---|---|---|
| Example 1 | 2 | 98 | 123.7 | 94.5 | 0.2 | −3.0421 |
| Example 2 | 5 | 95 | 121.9 | 94.3 | 0.3 | −1.0702 |
| Example 3 | 8.5 | 91.5 | 120.3 | 94.3 | 0.1 | 0.68 |
| Example 4 | 15 | 85 | 116.1 | 94.2 | 0.5 | 4.52 |
| Example 5 | 38 | 62 | 108 | 94.1 | 0.3 | 22.2 |
| Example 6 | 50 | 50 | 105.3 | 94.7 | 0.4 | 26.6 |
| Example 7 | 75 | 25 | 97.8 | 94.6 | 0.7 | 46.77 |
| Example 8 | 85 | 15 | 97.2 | 94.5 | 0.2 | 51.52 |
| Example 9 | 95 | 5 | 95.7 | 94.4 | 0.3 | 58.09 |
| Comparative Example 1 | 100 | 0 | 95 | 94.5 | 0.3 | 60.55 |
| Comparative Example 2 | 0 | 100 | 125 | 94.5 | 0.2 | −3.5 |

Examples 10 to 11

The film was manufactured by using the same method as Examples 1 to 9, except that the poly(N-cyclohexylmaleimide-co-methyl methacrylate) resin ($M_w$=97,500, $M_n$=48,100, Tg=138.3° C.) in which the content of N-cyclohexylmaleimide polymerized in Preparation Example 2 was 24% by weight was used and the film was manufactured by using the hot press method. The physical properties of the film are described in the following Table 2.

TABLE 2

|  | resin composition | | | | |
|---|---|---|---|---|---|
|  | phenoxy based resin (% by weight) | (metha)acrylate based resin (% by weight) | Tg (° C.) | transmittance (%) | Haze (%) |
| Example 10 | 15 | 85 | 126.7 | 93.6 | 0.2 |
| Example 11 | 38 | 62 | 113.1 | 93.4 | 0.2 |

The extruding of pellet was carried out at the barrel temperature of the extruder of 250° C., and the film was manufactured by using the hot press (240° C., 250 bar) Physical properties of the manufactured film are described in Table 2. In each case, the single glass transition temperature (Tg) was observed, the transmittance of the film was 90% or more, and the haze was 0.5% or less.

Examples 12 to 13

The film was manufactured by using the same method as Examples 1 to 9, except that the poly(N-cyclohexylmaleimide-co-methyl methacrylate) resin ($M_w$=93,500, $M_n$=38,300, Tg=155.5° C.) in which the content of N-cyclohexylmaleimide polymerized in Preparation Example 3 was 50% by weight was used and the film was manufactured by using the hot press method.

The extrusion of pellet was carried out at the barrel temperature of the extruder of 240° C. (if the extrusion was carried out at the barrel temperature of the extruder of 250° C. in Example 13, the pellet was opaque). The film was manufactured by using the obtained pellets using the hot press (220 to 240° C., 250 bar). Examples 12 and 13 carried out the hot press at the temperature in the range of 240° C. and 220° C. (if the temperature of the hot press was 240° C. in Example 13, the film was opaque).

Physical properties of the manufactured film are described in the following Table 3. In each case, the single glass transition temperature (Tg) was observed, the transmittance of the film was 90% or more, and the haze was 0.5% or less. The photoelasticity coefficient was not measured.

TABLE 3

|  | resin composition | | | | |
|---|---|---|---|---|---|
|  | phenoxy based resin (% by weight) | (metha)acrylate based resin (% by weight) | Tg (° C.) | transmittance (%) | Haze (%) |
| Example 12 | 15 | 85 | 134.5 | 93.7 | 0.4 |
| Example 13 | 38 | 62 | 118.6 | 93.3 | 0.3 |

Examples 14 to 16

The film was manufactured by using the same method as Examples 1 to 9, except that the poly(N-cyclohexylmaleimide-co-methyl methacrylate) resin in which the content of N-cyclohexylmaleimide polymerized in Preparation Example 1 was 6.5% by weight was used as the composition of the following Table 4. The physical properties of the film are described in the following Table 4.

TABLE 4

|  | resin composition | | | | |
|---|---|---|---|---|---|
|  | phenoxy based resin (% by weight) | (metha)acrylate based resin (% by weight) | Tg (° C.) | Haze (%) | Total transmittance (Tt) (%) |
| Example 14 | 7.3 | 92.7 | 119.2 | 0.2 | 94.3 |
| Example 15 | 10 | 90 | 115.4 | 0.2 | 94.3 |

The invention claimed is:

1. A method for manufacturing an optical film, the method comprising the steps of:
preparing a resin composition comprising
(a) a copolymer comprising 50 to 99% by weight of a (meth)acrylate based unit and 1 to 50% by weight of a cyclic based unit having a cyclic portion derived from N-cyclohexylmaleimide and
(b) an aromatic based resin having a chain having a hydroxy group containing portion and an aromatic moiety; and
shaping the optical film by using the resin composition,
wherein a haze value of the optical film is 2.5% or less,
the aromatic based resin includes a phenoxy based resin, and
the aromatic based resin includes at least one type of 5 to 10,000 units that are represented by Formula I:

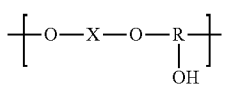

[Formula 1]

wherein X is a divalent group comprising at least one benzene cycle and R is a straight- or branched-chained alkylene group having 1 to 6 carbon atoms.

2. The method for manufacturing an optical film as set forth in claim 1, further comprising:
uniaxially or biaxially stretching the film.

3. A method for manufacturing an optical film, the method comprising the steps of:
preparing a resin composition comprising
(a) a copolymer comprising 50 to 99% by weight of a (meth)acrylate based unit and 1 to 50% by weight of a cyclic based unit having a cyclic portion derived from N-cyclohexylmaleimide and
(b) an aromatic based resin having a chain having a hydroxy group containing portion and an aromatic moiety; and
shaping the optical film by using the resin composition,
wherein the aromatic based resin includes 5 to 10,000 units that are represented by the following Formula 6:

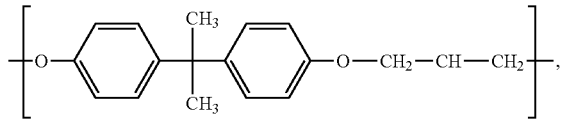

[Formula 6]

wherein a transmittance of the resin composition is 70% or more, and a haze value of the optical film is 2.5% or less.

4. The method for manufacturing an optical film as set forth in claim 3, further comprising:
uniaxially or biaxially stretching the film.

5. The method for manufacturing an optical film as set forth in claim 1, wherein the (meth)acrylate based unit is selected from the group consisting of methyl methacrylate, methyl acrylate, ethyl acrylate, butyl acrylate, 2-ethylhexyl methacrylate, lauryl methacrylate and benzyl methacrylate.

6. The method for manufacturing an optical film as set forth in claim 1, wherein the aromatic based resin has a number average molecular weight in the range of 1,500 to 2,000,000 g/mol.

7. The method for manufacturing an optical film as set forth in claim 1, wherein X is a divalent group that is selected from the group consisting of the following Structural Formulas:

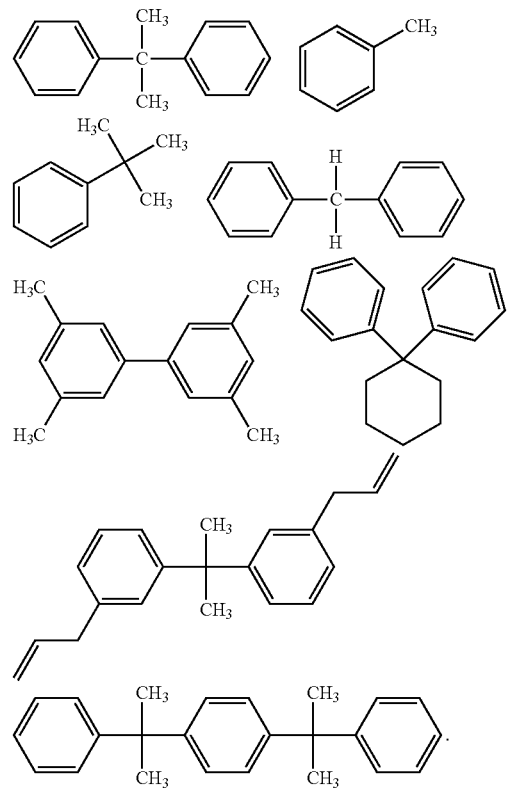

8. The method for manufacturing an optical film as set forth in claim 1, wherein the aromatic based resin includes 5 to 10,000 units that are represented by the following Formula 6:

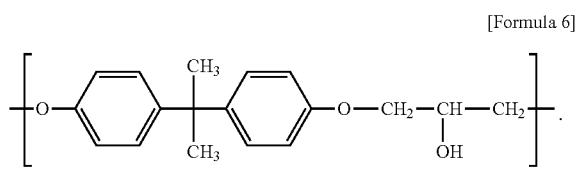

[Formula 6]

9. The method for manufacturing an optical film as set forth in claim 1, wherein the resin composition has a single glass transition temperature.

10. The method for manufacturing an optical film as set forth in claim 1, wherein the transmittance of the resin composition is 70% or more.

11. The method for manufacturing an optical film as set forth in claim 1, wherein the transmittance of the resin composition is 90% or more.

12. The method for manufacturing an optical film as set forth in claim 1, wherein the copolymer provides a retardation property in which a thickness refractive index is larger than an average in-plane refractive index to a film, and the aromatic based resin provides a retardation property in which a thickness refractive index is smaller than an average in-plane refractive index.

* * * * *